(12) United States Patent
Santamaria

(10) Patent No.: US 7,566,068 B2
(45) Date of Patent: Jul. 28, 2009

(54) DEVICE FOR LOCKING AND UNLOCKING THE FOLDED AND UNFOLDED POSITIONS OF AN INFANT PUSHCHAIR

(75) Inventor: Manuel Jane Santamaria, Palau Solita I Plegamans (ES)

(73) Assignee: Jane, S.A., Barcelona (ES)

( * ) Notice: Subject to any disclaimer, the term of this patent is extended or adjusted under 35 U.S.C. 154(b) by 0 days.

(21) Appl. No.: 12/124,025

(22) Filed: May 20, 2008

(65) Prior Publication Data

US 2008/0295554 A1 Dec. 4, 2008

(30) Foreign Application Priority Data

May 31, 2007 (ES) .............................. 200701159 U

(51) Int. Cl.
*B62B 1/00* (2006.01)
(52) U.S. Cl. .................................... 280/647; 280/47.38
(58) Field of Classification Search ................. 280/647, 280/642, 650, 657, 658, 47.38
See application file for complete search history.

(56) References Cited

U.S. PATENT DOCUMENTS

| | | | | |
|---|---|---|---|---|
| 3,653,681 A | * | 4/1972 | Virtue | 280/642 |
| 3,873,116 A | * | 3/1975 | Perego | 280/650 |
| 6,820,891 B2 | * | 11/2004 | Suga | 280/642 |
| 6,896,286 B2 | * | 5/2005 | Lin | 280/650 |
| 7,210,699 B2 | * | 5/2007 | Lan | 280/642 |
| 7,278,652 B2 | * | 10/2007 | Riedl et al. | 280/642 |

\* cited by examiner

*Primary Examiner*—Christopher P Ellis
*Assistant Examiner*—Bridget Avery
(74) *Attorney, Agent, or Firm*—Merchant & Gould P.C.

(57) ABSTRACT

A device is for locking and unlocking the folded and unfolded positions of an infant pushchair. During the folding and unfolding operations the handlebar being slid on the front legs, the device being actuated by means of a rope and having a lock at each side. The lock has a housing having an open lower portion and housing the active element, a flat being slidably fifed to each of the lateral faces of the housing, the flats being connected together at an end at which they are actuated by the rope. Each of the flats in its central region having an oblique slot, a pin extending through the active element being in a position to be shifted along the oblique slots, the active element being transversally shifted in the empty space of the housing when the flats are made to carry out a longitudinally shifting motion and thus bringing about the locking and unlocking with respect to the locking points being provided on the front legs.

2 Claims, 1 Drawing Sheet

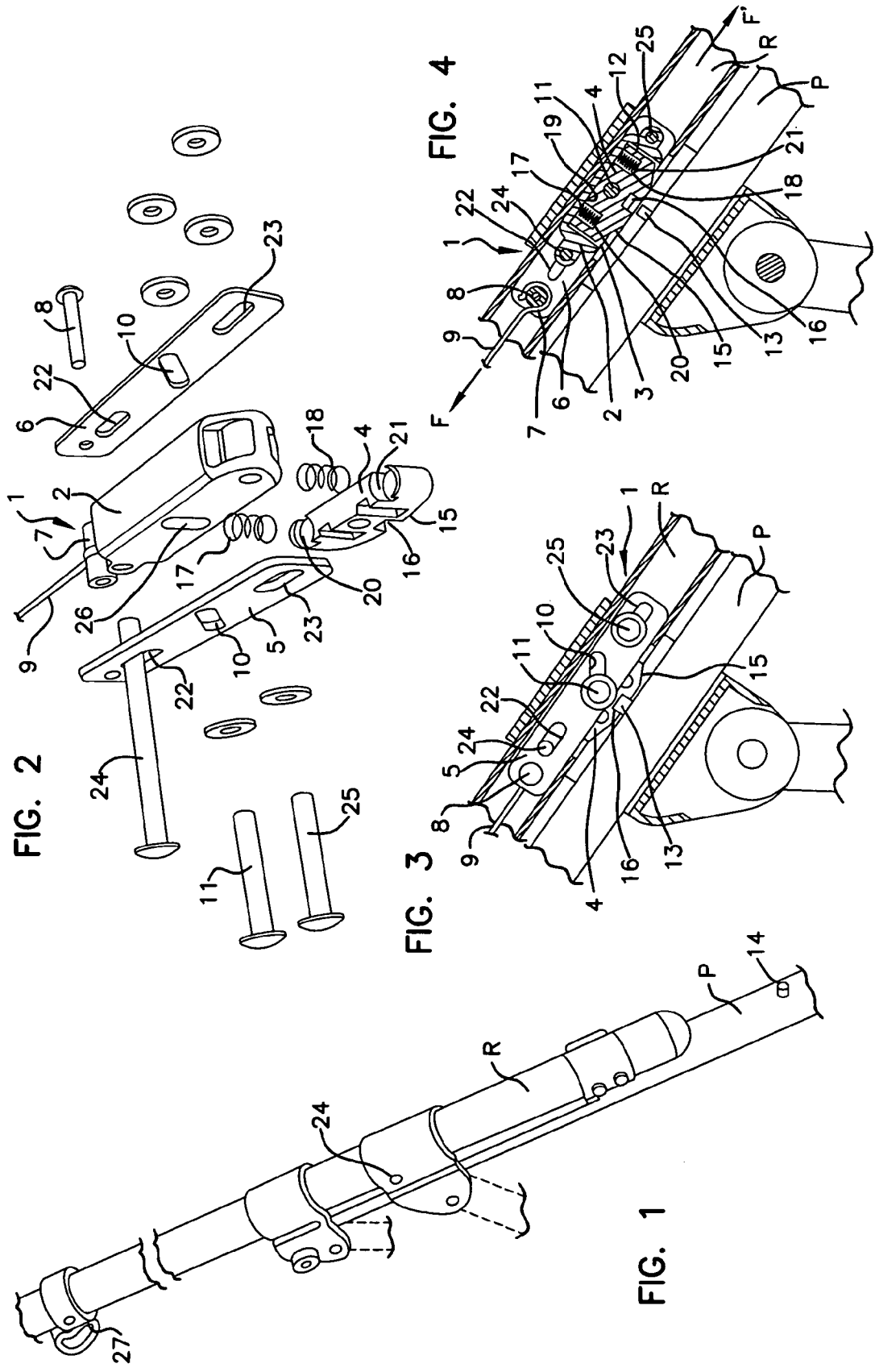

DEVICE FOR LOCKING AND UNLOCKING THE FOLDED AND UNFOLDED POSITIONS OF AN INFANT PUSHCHAIR

A device for locking and unlocking the folded and unfolded positions of an infant pushchair.

BACKGROUND OF THE INVENTION

The device is mainly applicable in those infant pushchairs whose folding is carried out by slidingly shifting the handlebar branches on the corresponding front legs, said device being such as to be actuated from the upper portion of the handlebar branches by means of a rope being used to actuate a lock being adapted to lock the folded and unfolded positions of the pushchair by coming into engagement with respective locking points being provided at the upper portion and at the lower portion of the front legs.

Although in the case of the pushchair being the object of patent FR-2 648 102 the folding is carried out in a different manner, said pushchair comprises a locking device being made up by a rope-actuated lock having two positions.

Locks of different make-ups are known which are of a hook-shaped type or have the shape of an articulated lever or else are formed by a rotatable bush through which a pin extends while being in a position to be shifted along oblique slots of the bush and longitudinal slots of the handlebar branches.

SUMMARY OF THE INVENTION

This invention has as its object a device having a lock of simple make-up being operable to produce a positive action, said lock because of its make-up being besides arranged in a disguised arrangement because of being concealed in the actual tubular branches of the handlebar.

The device in question is characterised in that the lock comprises a housing having an open lower portion and housing the active element, a flat being slidably fitted to each of the lateral faces of the housing, said flats being connected together at an end at which they are actuated by means of the rope, each of said flats in its central region having an oblique slot, a pin extending through the active element being in a position to be shifted along said oblique slots, said active element being transversally shifted in the empty space of the housing when the flats are made to carry out a longitudinally shifting motion and thus bringing about the locking and unlocking with respect to the locking points being provided on the front legs.

The active element in its lower face has a recess being such as to come into engagement upon the locking points in the locking positions, these latter being secured by means of springs being interposed between the active element and the housing.

Each of the flats has in each of its end regions a respective longitudinal slot through which a respective pin extends and is provided for having the flats duly fitted to the housing, and the housing has in each of its lateral faces a respective transversal slot along which the pin extending through the active element is in a position to be shifted.

These and other characterising features will be best made apparent by the following detailed description whose understanding will be made easier by the accompanying sheet of drawings showing a practical embodiment being cited only by way of example not limiting the scope of the present invention.

DESCRIPTION OF THE DRAWINGS

In the drawings:

FIG. 1 illustrates in a perspective view the infant pushchair handlebar branch where this locking and unlocking device is installed, said branch being slidably fitted onto the corresponding front leg;

FIG. 2 shows in a perspective, exploded view the set of components forming the lock;

FIG. 3 shows the lock in a locking position with the handlebar branch being shown in a longitudinal section; and FIG. 4 illustrates the lock in an unlocking position as seen in a longitudinal section.

DETAILED DESCRIPTION

According to the drawings this device comprises a lock (1) having a housing (2) having an open lower portion (3) (FIG. 4) and housing the active element (4), a flat (5 and 6) being slidably fitted to each of the lateral faces of the housing (2), said flats being connected together at an end by means of a bush (7) and pin (8) at which they are actuated by means of the rope (9), each of said flats (5 and 6) in its central region having an oblique slot (10), a pin (11) extending through the active element (4) (FIG. 4) being in a position to be shifted along said oblique slots, said active element being transversally shifted in the empty space (12) of the housing (2) when the flats (5 and 6) are made to carry out a longitudinally shifting motion as per arrow (F) and thus bringing about the locking (FIG. 3) and unlocking (FIG. 4) with respect to the locking points (13 and 14) being provided on the front legs (P) of the infant pushchair.

The active element (4) in its convex lower face (15) has a central recess (16) being such as to come into engagement upon the locking points (13 and 14) in the locking position, this latter being secured by means of two springs (17 and 18) being interposed between the active element (4) and the bottom (19) of the housing (2) and housed in respective cavities (20 and 21) being provided in the upper face of the active element (4) (FIG. 4).

Each of the flats (5 and 6) has in each of its end regions a respective longitudinal slot (22 and 23) through which a respective pin (24 and 25) extends and is provided for having the flats duly fitted to the housing (2), and this latter has in each of its lateral faces a respective transversal slot (26) (FIG. 2) along which the pin (11) extending through the active element (4) is in a position to be shifted.

Reference (R) denotes the handlebar branches and reference (27) denotes the control being fitted to the upper end of the rope (9), said control being made up by a sleeve being slidably fitted around the upper portion of the handlebar branch (R).

The operation of this device is as follows: FIG. 3 illustrates the stable arrangement locking the unfolded position of the infant pushchair. When pulling the rope as per arrow (F) (FIG. 4) the flats (5 and 6) are shifted and the pin (11) is forced to slide along the oblique slots (10) and is thus transversally shifted along the slots (26) of the housing (2) thereby driving the active element (4) towards the inside of the housing (2) and thus compressing the springs (17 and 18) and lifting said active element off the locking points (13).

In this arrangement the handlebar branches (R) can be shifted downwards on the corresponding leg (P) in order to thus have the pushchair folded. The springs (17 and 18) exert again their spring return action and the active element (4) is slidingly shifted on said leg and when arriving at the locking point (14) and due to the convexity of the lower face of said active element (4) surmounts it till the central recess (16) is brought into engagement with it, the pushchair's folded position being at this point locked.

The invention claimed is:

1. A device for locking and unlocking an infant pushchair at folded and unfolded positions, during the folding and unfolding operations a handlebar being slid on front legs, the device being actuated of a rope and comprising a lock at each side; wherein the lock comprises a housing having an open lower portion and housing an active element, a flat being slidably fitted to each of the lateral faces of a housing, said flats being connected together at an end at which they are actuated of the rope, each of said flats in its central region having an oblique slot, a pin extending through the active element being in a position to be shifted along said oblique slots, said active element being transversally shifted in the empty space of the housing when the flats carry out a longitudinally shifting motion, bringing about the locking and unlocking with respect to locking points being provided on the front legs, the active element having a convex lower face with a central recess configured to come into engagement upon the locking points in the locking positions, the locking points being secured by springs interposed between the active element and the housing.

2. A device for locking and unlocking an infant pushchair, as per claim 1, wherein each of the flats has in each of its end regions a respective longitudinal slot through which a respective pin extends and is provided for having the flats fitted to the housing, and the housing has in each of its lateral faces a respective transversal slot along which the pin extending through the active element is in a position to be shifted.

* * * * *